US012113276B2

(12) United States Patent
Bamford et al.

(10) Patent No.: US 12,113,276 B2
(45) Date of Patent: Oct. 8, 2024

(54) TRANSPARENT BROADBAND ANTENNA

(71) Applicant: John Mezzalingua Associates, LLC, Liverpool, NY (US)

(72) Inventors: Lance Bamford, Pittsford, NY (US); Jeremy Benn, Liverpool, NY (US)

(73) Assignee: John Mezzalingua Associates, LLC, Liverpool, NY (US)

(*) Notice: Subject to any disclaimer, the term of this patent is extended or adjusted under 35 U.S.C. 154(b) by 126 days.

(21) Appl. No.: 17/845,102

(22) Filed: Jun. 21, 2022

(65) Prior Publication Data

US 2022/0407237 A1 Dec. 22, 2022

Related U.S. Application Data

(60) Provisional application No. 63/213,425, filed on Jun. 22, 2021.

(51) Int. Cl.
*H01Q 13/08* (2006.01)
*H01Q 1/38* (2006.01)
*H01Q 1/50* (2006.01)

(52) U.S. Cl.
CPC ............. *H01Q 13/085* (2013.01); *H01Q 1/38* (2013.01); *H01Q 1/50* (2013.01)

(58) Field of Classification Search
CPC ............ H01Q 1/38; H01Q 1/50; H01Q 1/241; H01Q 3/085
See application file for complete search history.

(56) References Cited

U.S. PATENT DOCUMENTS

| | | | | |
|---|---|---|---|---|
| 5,319,377 | A | 6/1994 | Thomas et al. | |
| 7,567,215 | B1 * | 7/2009 | All | H01Q 21/24 343/915 |
| 7,843,398 | B1 * | 11/2010 | Horner | H01Q 13/085 343/770 |
| 10,186,783 | B2 * | 1/2019 | Liao | H01Q 13/08 |
| 11,831,070 | B2 * | 11/2023 | LeBaron | H01Q 1/27 |
| 11,867,737 | B2 * | 1/2024 | Inoue | G01R 29/0878 |
| 2010/0149751 | A1 | 6/2010 | Camacho et al. | |
| 2011/0001679 | A1 | 1/2011 | Meharry et al. | |
| 2017/0222321 | A1 * | 8/2017 | Caratelli | H01Q 9/0485 |

(Continued)

OTHER PUBLICATIONS

Benavides, J.B., et al., “A Novel Hexagonal Shaped Fractal Antenna with Multi Band Notch Characteristics for UWB Applications,” Salesian Polytechnic University, Telecommunications and Telematics, 2018, pp. 830-833.

(Continued)

*Primary Examiner* — Raymond R Chai
(74) *Attorney, Agent, or Firm* — Meunier Carlin & Curfman LLC

(57) ABSTRACT

A transparent broadband antenna has two conductive leaves that are configured to be axially symmetric about two orthogonal axes. The transparent broadband antenna is designed as having two back-to-back Vivaldi radiators and four identically curved outer corners. The back-to-back Vivaldi radiators provide high performance from 617 MHz through 7 GHz while preventing return waves that may cause impedance mismatch. The antenna further comprises a feed structure that enables direct coupling from an RF cable to the two conductive leads, obviating the need for a matching circuit and subsequent bandwidth limitations.

13 Claims, 18 Drawing Sheets

(56) References Cited

U.S. PATENT DOCUMENTS

| | | | | |
|---|---|---|---|---|
| 2017/0229783 | A1* | 8/2017 | Liu | H01L 21/302 |
| 2021/0091475 | A1* | 3/2021 | Rabah | H01Q 9/265 |
| 2023/0217584 | A1* | 7/2023 | Choi | H01Q 5/357 |
| | | | | 174/255 |

OTHER PUBLICATIONS

Gibson, P.J., "The Vivaldi Aerial," 9th European Conference on Microwave, 1979, pp. 101-105.

Kindt, R.W., et al., "Benchmarking Ultrawideband Phased Antenna Arrays," IEEE Transactions on Antennas & Propagation Magazine, 2018, pp. 34-47.

Kindt, R.W., et al., "Ultrawideband All-Metal Flared-Notch Array Radiator," IEEE Transactions on Antennas & Propagation, vol. 58, No. 11, 2010, pp. 3568-3575.

Kumar, R.A., et al., "Design of Hybrid Fractal Antenna for UWB Application," International Conference on Computing, Electronics and Electrical Technologies (ICCEET), 2012, 3 pages.

Oraizi, H., et al., "Miniaturized UWB Monopole Microstrip Antenna Design by the Combination of Giusepe Peano and Sierpinski Carpet Fractals," IEEE Transactions on Antennas and Wireless Propagation Letters, vol. 10, 2011, pp. 67-70.

International Search Report and Written Opinion, dated Oct. 25, 2022, received in connection with corresponding International Application No. PCT/US2022/034243.

* cited by examiner

Design 1: 617 MHz upwards

Design 2: 617 MHz upwards
Minimized size

Design 4: 1695 MHz upwards

| Parameters | Units | Transparent Mesh 1 | Transparent Mesh 2 | Transparent Mesh 3 | Dense Mesh | Comments |
|---|---|---|---|---|---|---|
| Sheet Resistance (Taken from graph) | Ω/square | 0.6 | 0.4 | 0.9 | 0.08 | |
| Copper Thickness | µm | 1 | 1 | 1 | 1 | |
| Line Pitch | µm | 320 | 225 | 320 | 62 | |
| Line Width | µm | 18 | 10 | 14 | 18 | |
| Border Width | µm | 18 | 10 | 14 | NA | Border width same as line width |
| Coverage % | % | 10% | 15% | 10% | 50% | |
| %T, (optical transmission of mesh) (Bare PET is about 90% too) | % | 90% | 85% | 90% | 50% | |
| Resistivity | Ω per meter | 6.6E-08 | 4.8E-08 | 7.3E-08 | 3.7E-08 | |
| Conductivity | Siemens per meter | 1.5E+07 | 2.1E+07 | 1.37E+07 | 2.7E+07 | |

FIG. 13

TRANSPARENT BROADBAND ANTENNA

This application claims priority to U.S. Provisional Patent Application No. 63/213,425, filed Jun. 22, 2021, pending, which application is hereby incorporated by this reference in its entirety as if fully set forth herein.

BACKGROUND OF THE DISCLOSURE

Field of the Invention

The present invention relates to wireless communications, and more particularly, to compact broadband antennas.

Related Art

It has been determined that the majority of cellular data usage demanding high data rates—and thus high bandwidth—occurs within buildings. Further, with the advent of 5G, demand for high data rates may be accommodated by using higher RF frequencies. For example, the designated 5G mid band occupies RF spectrum from 0.617 GHz to 6 GHz. Although the higher frequency bands provide for very high data rates, radio propagation in these frequency bands can be hampered by obstacles and intervening structures. Overcoming this shortcoming requires network operators to deploy numerous antennas to assure continuous coverage. This problem is particularly acute within buildings.

Conventional antennas suffer certain deficiencies that prevent them from adequately servicing mid band 5G frequencies in indoor settings: conventional antennas are cumbersome and are difficult to deploy within buildings in such a way as to blend into their environment; and conventional antennas typically do not provide for adequate performance in the broad mid band range.

Further, a key feature of 5G is its MIMO (Multi Input Muli Output) capabilities, which includes 2×2 MIMO, 4×4 MIMO, 16×16 MIMO, etc. Higher order MIMO configurations can greatly increase the size and complication of the antenna, given that each port (e.g., of the 16×16 MIMO) needs a radiator. This can lead to considerable design challenges for an indoor antenna.

Accordingly, what is needed is a broadband antenna that performs well in the 5G mid band frequency range yet is sufficiently thin and compact to be deployed throughout an indoor environment in such a way that they are easy to install and unobtrusive.

SUMMARY OF THE DISCLOSURE

Accordingly, the present invention is directed to a transparent broadband antenna that obviates one or more of the problems due to limitations and disadvantages of the related art.

An aspect of the disclosure involves an antenna that comprises a first conductive leaf coupled to an inner feed conductor; and a second conductive leaf coupled to an outer feed conductor; a feed structure configured to couple the inner feed conductor to an inner conductor of an RF cable and couple the outer feed conductor to an outer conductor of the RF cable, wherein the first conductive leaf and the second conductive leaf are disposed on a substrate, and wherein the first conductive leaf and the second conductive leaf are axially symmetric about a first axis and a second axis, the second axis being orthogonal to the first axis, and wherein the first axis bisects both the first conductive leaf and the second conductive leaf and the second axis separates the first conductive leaf and the second conductive leaf.

Another aspect of the disclosure involves an antenna having a central x axis and a central y axis. The antenna comprises a first conductive leaf disposed on the substrate; a second conductive leaf disposed on the substrate; and an RF(Radio Frequency) feed structure that electrically couples a first RF conductor to the first conductive leaf and a second RF conductor to the second conductive leaf, wherein both the first conductive leaf and the second conductive leaf are symmetric about the central x axis, and the first leaf and the second leaf each mirror each other about the central y axis.

Another aspect of the disclosure involves an N×N MIMO (Multiple Input Multiple Output) antenna having a longitudinal axis. The antenna comprises a plurality of conductive leaves arranged in a sequence along the longitudinal axis, wherein the plurality of conductive leaves are symmetric about the longitudinal axis, wherein each adjacent pair of conductive leaves form two Vivaldi radiators disposed on opposite sides of the longitudinal axis; and a plurality of RF feed structures disposed along the longitudinal axis, wherein each of the plurality of RF feed structures is disposed at a convergence point between two adjacent conductive leaves, wherein a number of conductive leaves is equal to N+1.

BRIEF DESCRIPTION OF THE DRAWINGS

The accompanying figures, which are incorporated herein and form part of the specification, illustrate a transparent broadband antenna. Together with the description, the figures further serve to explain the principles of the transparent broadband antenna described herein and thereby enable a person skilled in the pertinent art to make and use the transparent broadband antenna.

FIG. 13 is a table of exemplary copper mesh parameters, including copper thickness, line width, and line pitch.

DESCRIPTION OF EXEMPLARY EMBODIMENTS

Reference will now be made in detail to embodiments of the transparent broadband antenna with reference to the accompanying figures. The same reference numbers in different drawings may identify the same or similar elements.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

Figure 1:
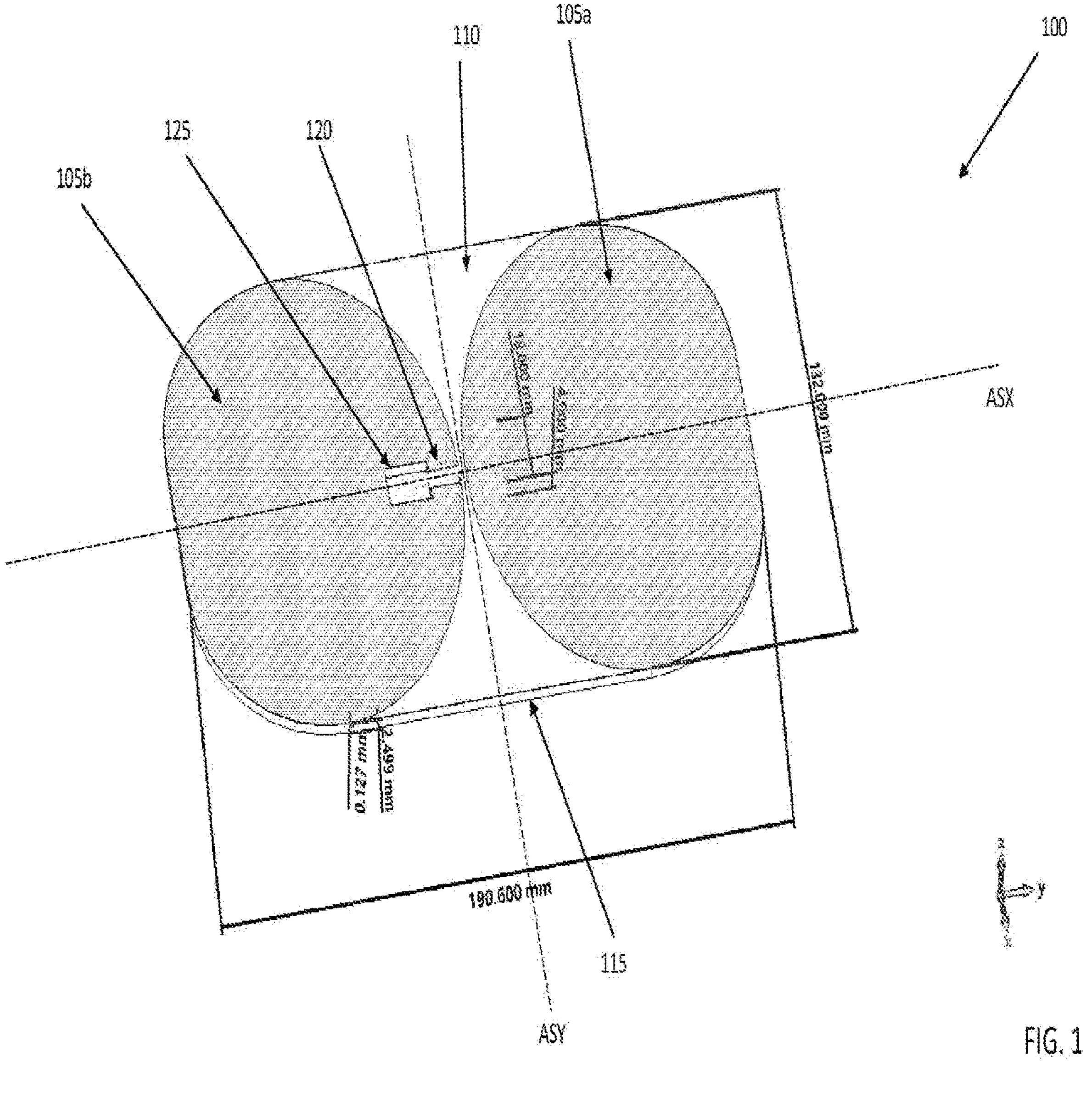
FIG. 1 illustrates an exemplary transparent broadband antenna according to the disclosure.

FIG. 1 illustrates an exemplary transparent broadband antenna structure 100 according to the disclosure. Antenna 100 has a first transparent radiator leaf (or conductive leaf) 105*a* and a second transparent radiator leaf (or conductive leaf) 105*b*. First conductive leaf 105*a* and second conductive leaf 105*b* may be formed of a transparent conductor that is disposed on a backing film 110. First conductive leaf 105*a* and second conductive leaf 105*b* may be etched to have a lobe-like shape whereby first and second conductive leaf 105*a/b* may have identical shapes and are arranged as mirror images of each other. Further, first conductive leaf 105*a* and second conductive leaf 105*b* may both be axially symmetric about an axis of symmetry ASX as well as symmetric about axis ASY, as illustrated in FIG. 1. Axis ASX may also be referred to as a longitudinal axis. First conductive leaf 105*a* and second conductive leaf 105*b* may be independently fed a respective RF signal at a feed point 120 through a feed point aperture 125, using feed structures that are disclosed below. The feed structure itself is not shown in FIG. 1.

The transparent conductor used to form first conductive leaf 105*a* and second conductive leaf 105*b* may be a thin copper mesh, such has Kodak's EKTAFLEX line of transparent conductive copper mesh, although other similar films may be used provided that they are sufficiently conductive to enable current flow to radiate RF energy as a broadband antenna element. In this example, the transparent copper mesh may be disposed on a backing film 110, such as polyester film. An exemplary material for backing film may be PET (polyethylene terephthalate), although any RF material, such as a Teflon-based material, may be used. Backing film 110 may in turn be disposed on a substrate 115, which may be formed of polycarbonate or glass. The backing film 110 may enable etching of the transparent conductor into desired patterns, such as the arrangement of first conductive leaf 105*a* and second conductive leaf 105*b*. In an exemplary embodiment, a substrate 115 of polycarbonate such as Lexan, which may have a standard thicknesses in the range, but not exclusive: 1/16th inch to ½ inch; and backing film may have a thickness of 0.127 mm. In a variation, substrate 115 may be formed of a glass-reinforced epoxy laminate, such as FR4, which may be used in applications in which antenna 100 is to be painted.

Figure 2A:
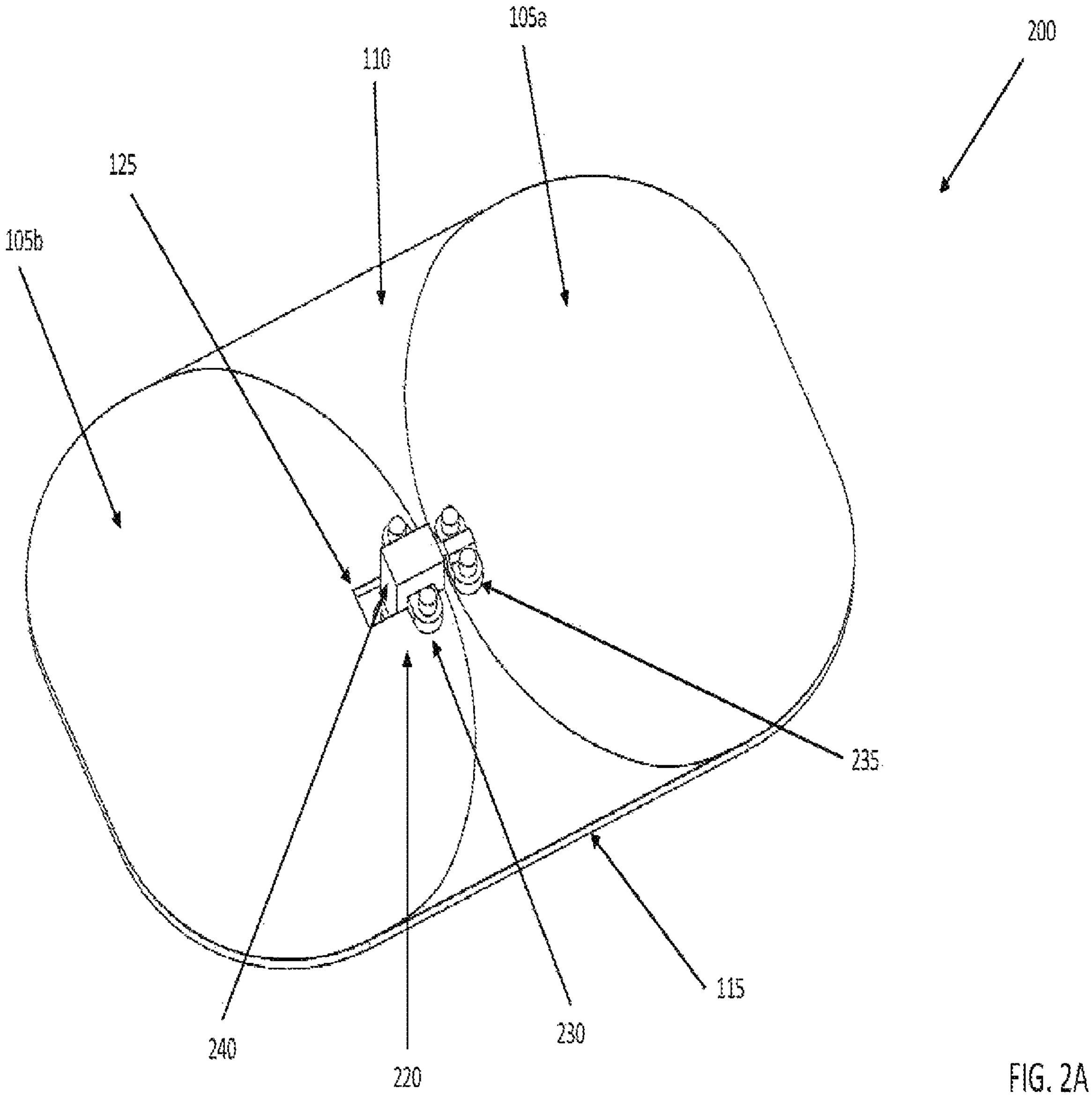
FIG. 2A illustrates a first variation of the exemplary transparent broadband antenna of FIG. 1 having a first exemplary feed point.

Exemplary dimensions for antenna structure 100 may be as follows: total length along axis ASX may be 190.6 mm; total width along axis ASY may be 132 mm FIG. 2A illustrates an exemplary transparent broadband antenna 200 having a first exemplary feed structure 220 according to the disclosure. Antenna 200 may have the same first conductive leaf 105*a*, second conductive leaf 105*b*, backing film 110, and substrate 115 as exemplary antenna structure 100. Feed structure 220 mechanically mounts to substrate 115 such that an RF feed line (now shown) may independently couple to conductive leaves 105*a/b* via feed point aperture 125. Feed structure 220 has a feed structure body 240 that is mechanically coupled to substrate 115 by first mechanical mount 235 that assures conductive coupling between feed structure 220 and first conductive leaf 105*a* and is mechanically coupled to substrate 115 by second mechanical mount 230.

Figure 2B:
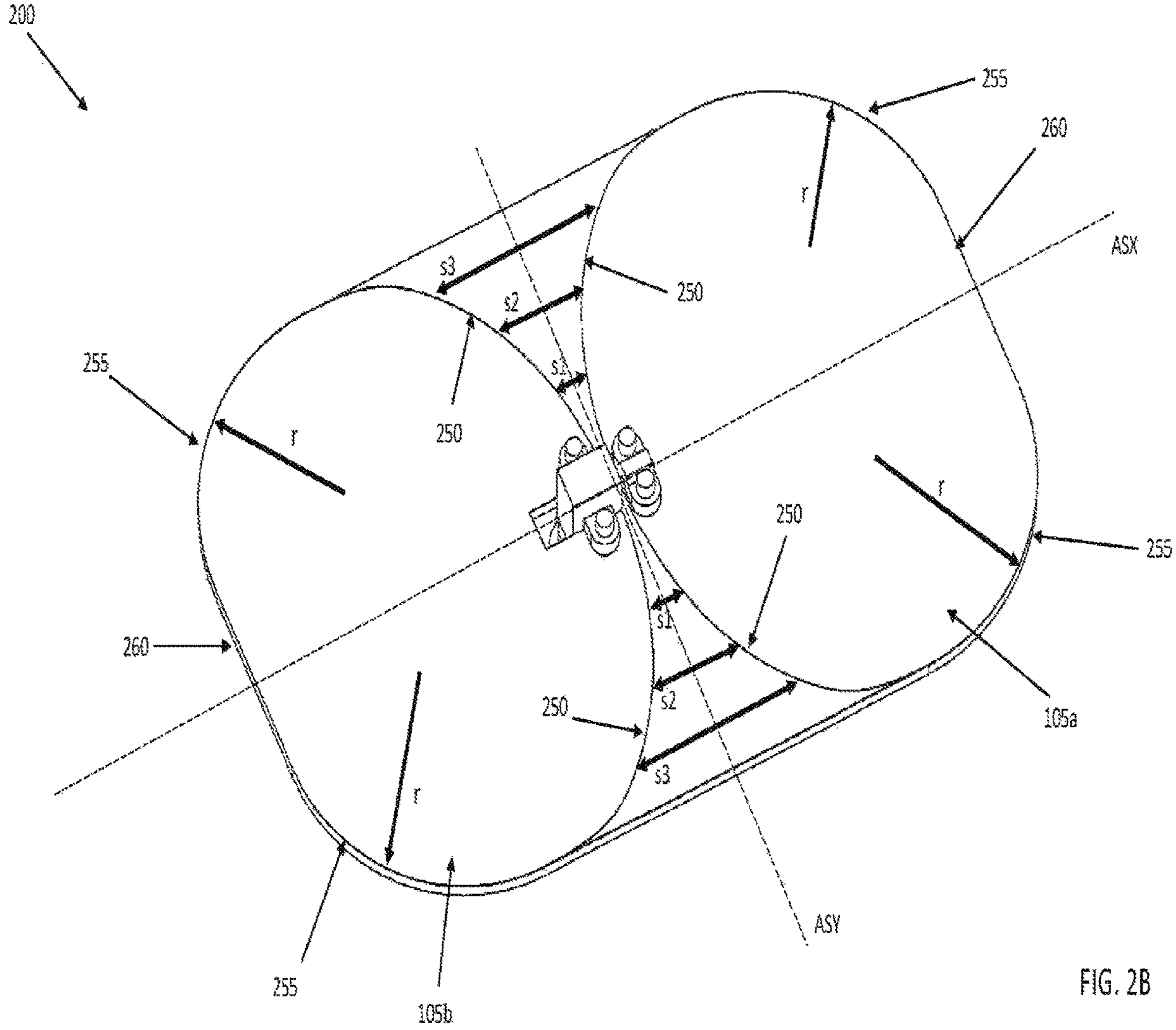
FIG. 2B illustrates the exemplary broadband antenna of FIG. 2A.

FIG. 2B is another view of antenna 200, indicating geometric features of conductive leaves 105*a/b*. It will be understood that this discussion of geometric features may apply to exemplary antenna structure 100 and other disclosed variations. As illustrated in FIGS. 2B and 2A, conductive leaves 105*a/b* are symmetric about both axes ASX and ASY. The configuration of conductive leaves 105*a/b* is such that they form two Vivaldi radiators oriented in a back-to-back configuration. The Vivaldi radiators are formed by the curvatures 250 of conductive leaves 105*a/b* where they face each other. The extent of curvatures 250 are such that the separation between conductive leaves 105*a/b* along axis ASX increases exponentially with increasing distance along axis ASY from ASX. Further illustrated are separations s1, s2, and s3. In keeping with the symmetry around both axes ASY and ASX, separation s1 is the same on both sides of axis ASY, given that they are each the same distance from axis ASX along axis ASY. The same holds for separations s2 and s3. Further, the magnitudes of separations s1, s2, and s3 are such that they increase exponentially as a function of distance from axis ASY. The minimum separation between conductive leaves 105*a/b* at their closest point (where axes ASX and ASY intersect) may be 2 mm, or in an exemplary embodiment, 2.0301 mm. This dimension may define the highest frequency in which antenna structure 100 operates.

Curvature 250 is described in more detail below.

Further to the geometry of antenna structure 100 is the curvature at the curved outer corners 255. These are indicated by curvature radius r. Given the axial symmetry of antenna structure 100 around axes ASX and ASY, the value of radius r will be the same at all four curved outer corners 255. The curvature of curved outer corners 255 provide control of the performance of antenna structure 100 at the low end of its frequency response. It does this as follows: the curved ends of conducting leaves 105*a/b* causes current to flow along the curved edge of curved outer corners 255, causing radiation at both curved outer corners 255 of first conductive leaf 105*a* and those of second conductive leaf 105*b*. The two curved outer corners of each of conductive leaves 105*a/b*, on opposite sides of axis ASY, allows for broadband controlled radiation (mainly in the low portion of the operational frequency band) and loss other than seen in a sharp corner structure, thereby reducing the magnitude of a reflected wave along the curvature back to feed point 120 and hence minimizing impedance mismatch at feed point 120. Further to the dimensions of antenna structure 100 is a flat edge 260 at the ends of the antenna. The length of the antenna, which affects the width of flat edges 260, may be configured to reduce the length of the antenna structure 100 for deploying in confined spaces.

In a variation, the outer curvatures 255 may simply mirror curvatures 250.

In keeping with the function of a Vivaldi radiator, the exponentially increasing separation between first conductive leaf 105*a* and second conductive leaf 105*b* provides for effective RF radiation across a wide range of frequencies. According to the principles of a Vivaldi radiator, each incremental separation distance between conductive leaves 105*a/b* (of which s1, s2, and s3 are samples) supports radiation at a wavelength corresponding to the length of the separation. Accordingly, given the width of antenna structure 100 along axis ASX, exemplary antenna has a good response from 600 MHz through 8 GHz. Further, given that antenna structure 100 has two opposing Vivaldi radiators defined by curvatures 250, each on opposite sides of axis ASX. Having back-to-back Vivaldi radiators offers an advantage in that it provides a natural 50 ohm impedance allowing for direct feeding from a coaxial cable. Allowing for feed simplification plus increased power handling capability which would normally be limited by the traditional single element microstrip line fed variant.

Figure 3A:
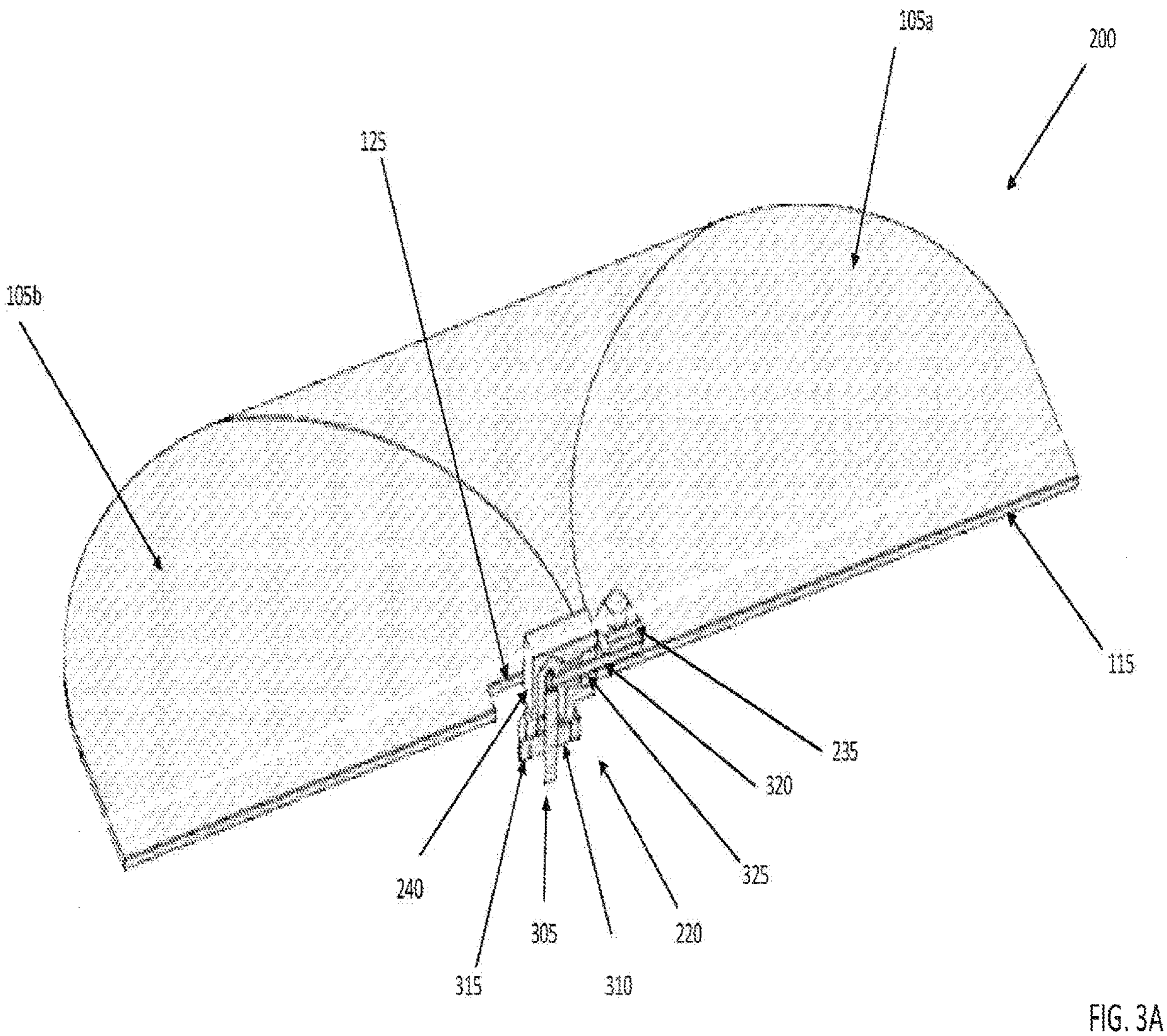
FIG. 3A is a cutaway view of the exemplary broadband antenna of FIG. 2A.

FIG. 3A is a cutaway view of the exemplary antenna 200 of FIG. 2A, showing one half of the antenna 200 as divided by axis ASX. The cutaway view of FIG. 3A reveals exemplary feed structure 220 disposed on substrate 115 and partly within feed aperture 125. Further illustrated in cutaway are feed structure body 240, which is mechanically and electrically coupled to port outer conductor 315; port inner conductor 305, which is mechanically and electrically isolated from port outer conductor by port insulator ring 310; and feed inner conductor 320, which is mechanically and electrically isolated from feed structure body 240 by feed insulator ring 325. As illustrated, feed inner conductor is electrically coupled and mechanically affixed to first conductive leaf 105*a* by first mechanical mount 235.

Figure 3B:
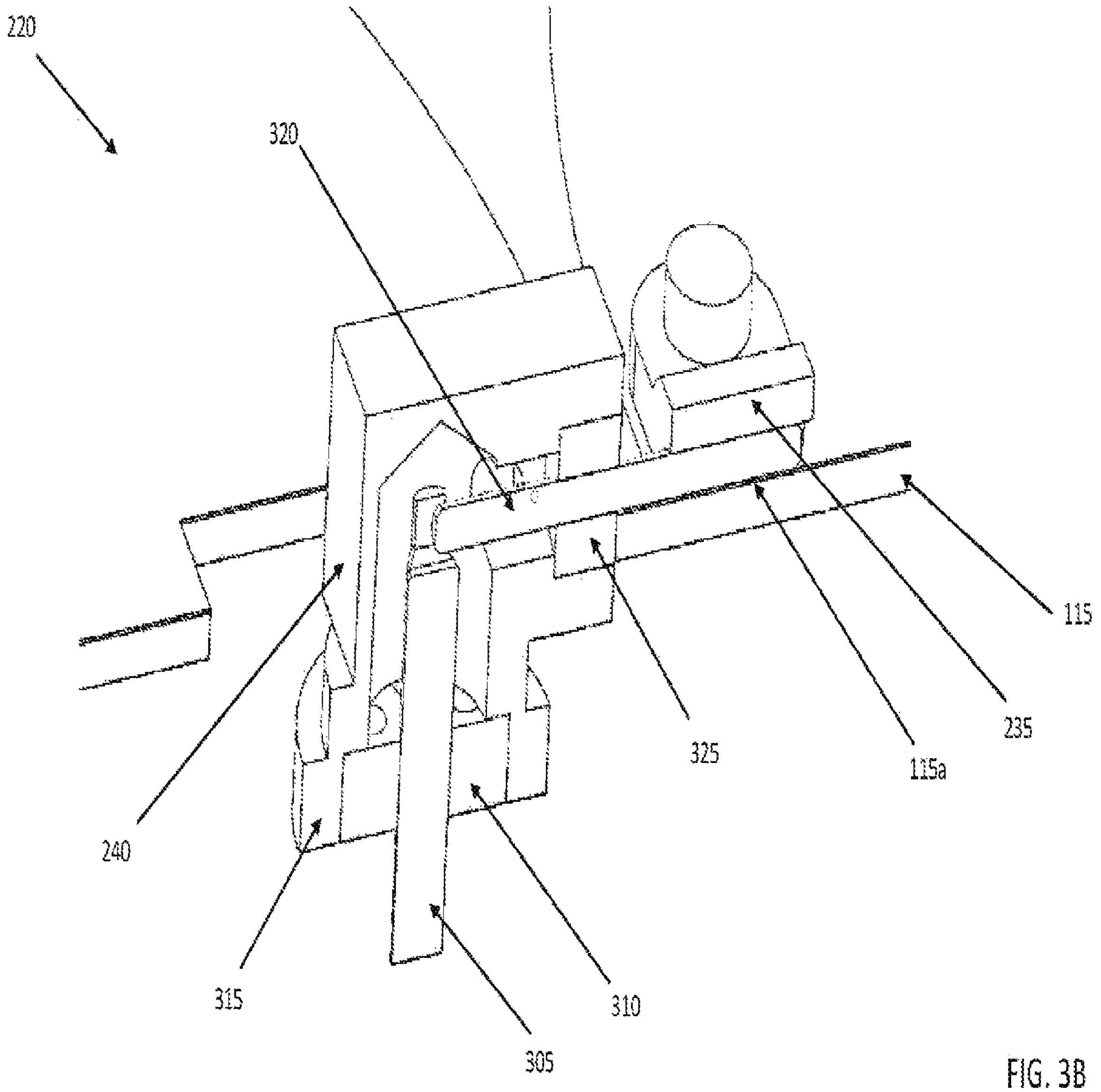
FIG. 3B is a close up view of the feed structure of the exemplary broadband antenna of FIG. 2A.

FIG. 3B is a close up view of the feed structure 220 of the exemplary antenna 200 of FIG. 2A. What is not shown in FIG. 3A or 3B is second mechanical mount 230, which electrically couples and mechanically affixes feed structure body 240 to second conductive leaf 105*b*. In doing so, it provides an electrically conductive path from port outer conductor 315 to second conductive leaf 105*b*. Further illustrated is the mechanical connection between port inner conductor 305 and feed inner conductor 320. The mechanical connection assures electrical continuity and prevents PIM (passive intermodulation distortion) and insertion loss variability that may arise from a 90 degree bend in a single feed conductor. The conductive materials used within feed structure 220 may be aluminum, brass, or similar materials with sufficient conductivity and structural rigidity.

Figure 4:
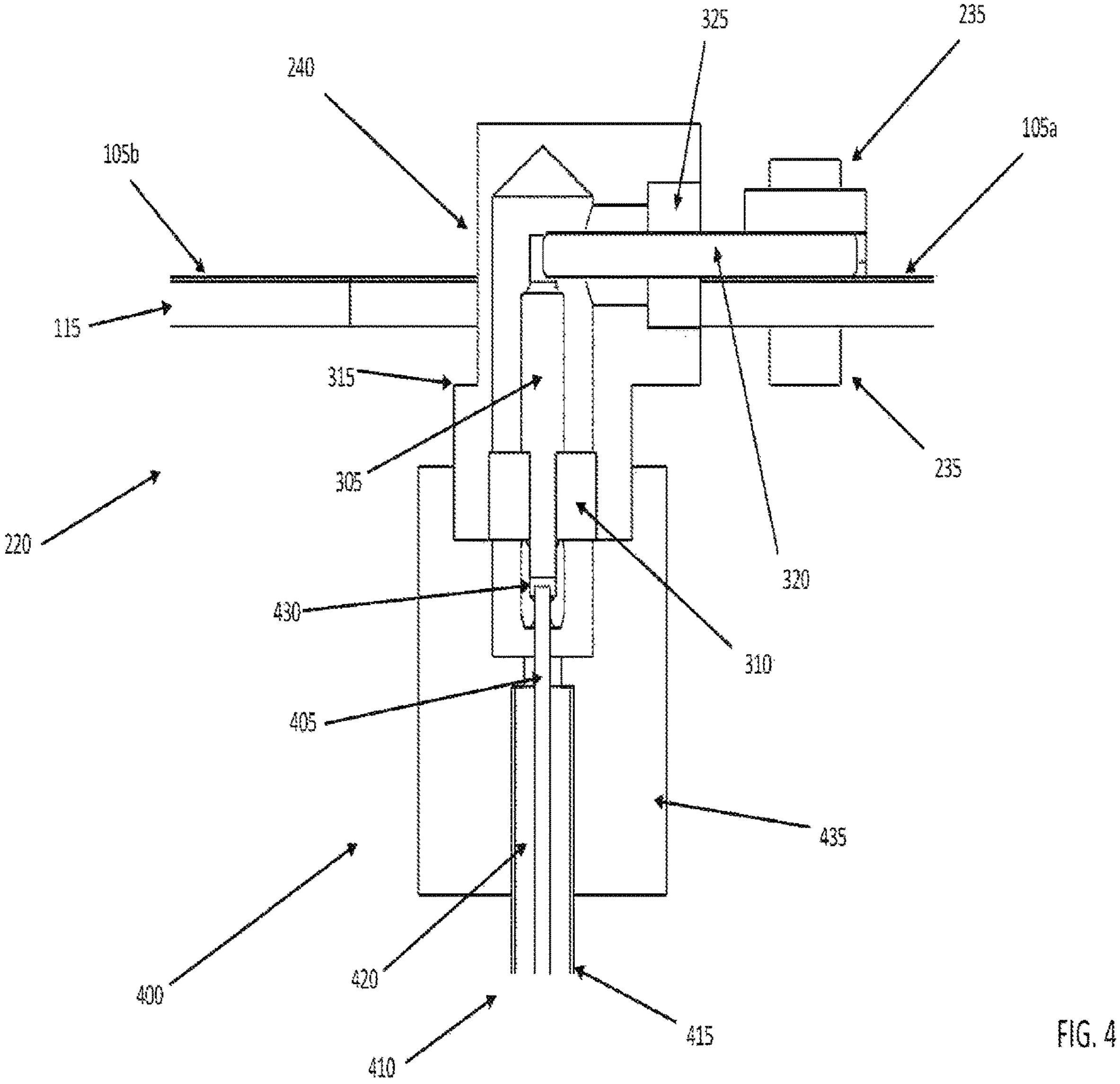
FIG. 4 is a further close up view of the feed structure of FIG. 3B with an RF connector coupled to it.

FIG. 4 is a side view of the cutaway view of FIGS. 3A and 3B, in which feed structure 220 is coupled to an RF connector 400. RF connector may be of a conventional variety, having a connector body 435 and an RF cable 410 that has an inner conductor 405 and an outer conductor 415, with an insulator 420 disposed between them. As illustrated, inner conductor 405 is mechanically coupled to inner port conductor 305 at mechanical interface 430, providing electrical continuity. Connector body 435 may include a conductive material that provides electrical continuity between RF cable outer conductor 415 and port outer conductor 315.

An advantage of the antenna 100/200 is that the feed point structure 220 enables direct coupling of an RF cable to the antenna itself. Conventional feeds for antennas, such as microstrip line feeds, require matching circuits that incur bandwidth restrictions. The disclosed direct feeds provided by feed structures 220 obviate the need for a matching circuit and thus do not suffer from such bandwidth restrictions.

Figure 5A:
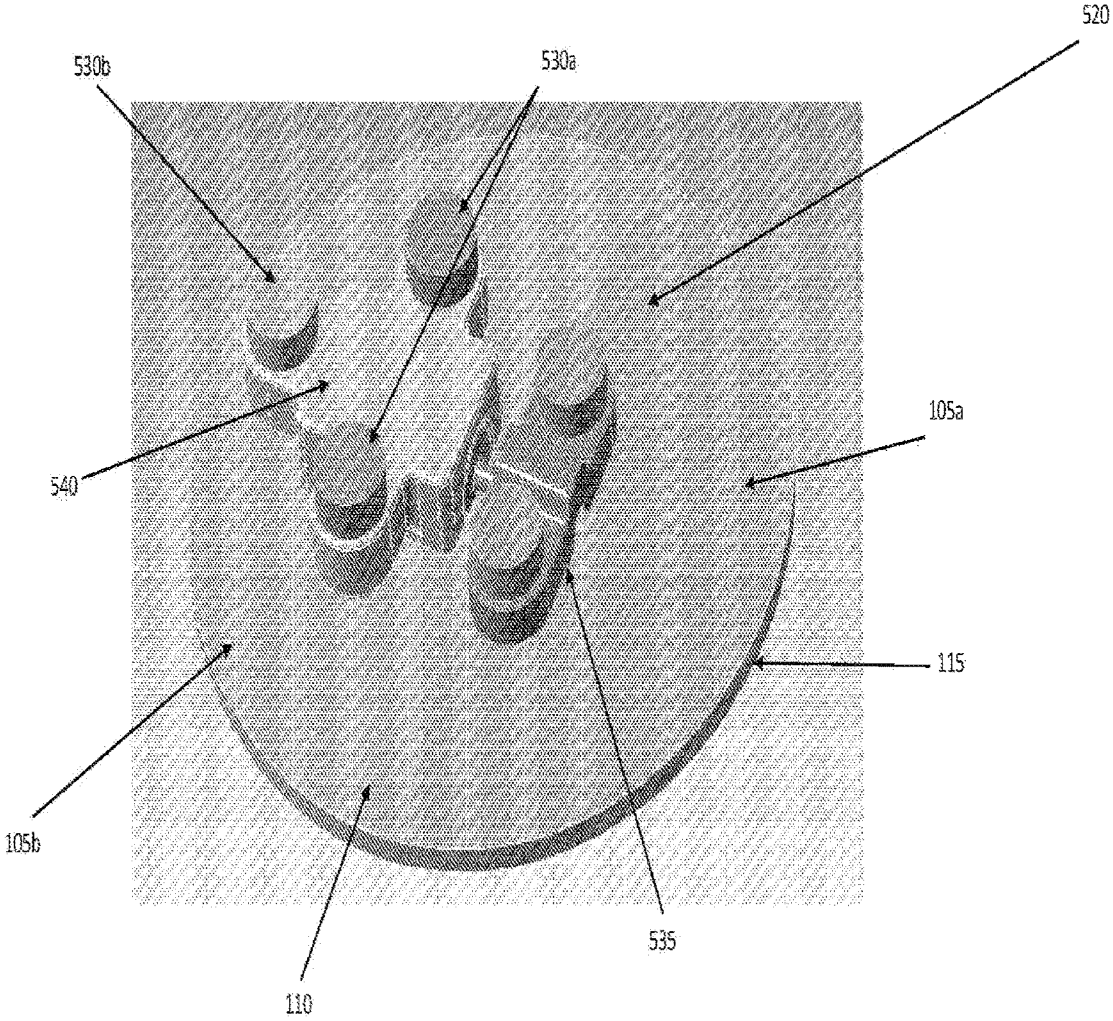
FIG. 5A illustrates another exemplary feed structure according to the disclosure.

FIG. 5A illustrates another exemplary feed structure 520 according to the disclosure. Feed structure 520 has a feed structure body 540 that is mechanically coupled to a substrate 115 and is electrically coupled to a second conductive leaf 105*b*; and a first mechanical mount 535 that mechanically and electrically couples a first conductor to substrate 115 and first conductive leaf 105*a*. It will be understood that first conductive leaf 105*a* and second conductive leaf 105*b*, as well as substrate 115 and backing film 110 in FIG. 5 may be the same as that illustrated in the preceding drawings. Feed structure body 240 may have a pair of matching mechanical mounts 530*a* symmetrically disposed on opposite sides of the conductor, and a third mechanical mount 530*b*, each of which secure the feed structure body to substrate 115.

Figure 5B:
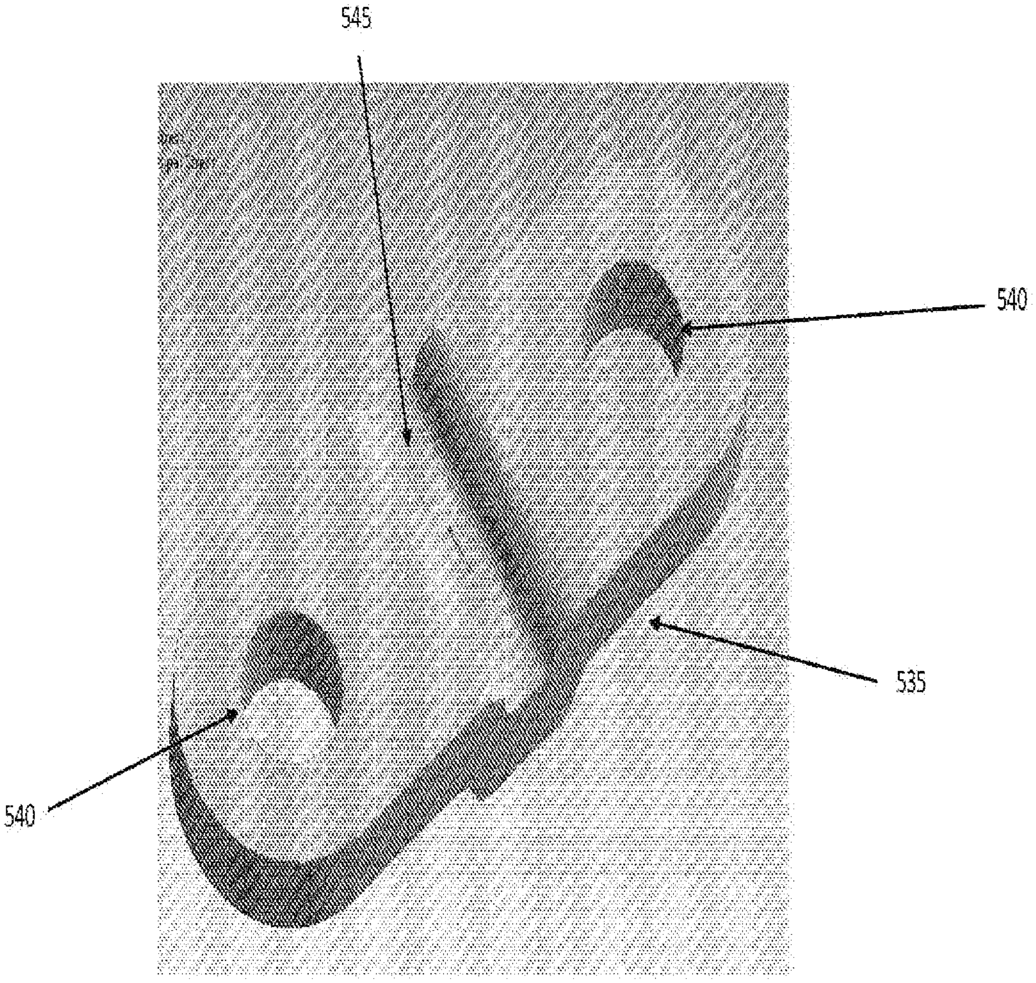
FIG. 5B illustrates an exemplary inner conductor retainer bracket of the exemplary feed structure of FIG. 5A.

FIG. 5B illustrates an exemplary first mechanical mount 535. First mechanical mount 535 has two mounting post apertures 540 and a first conductor slot 545 that secures an RF cable feed inner conductor (not shown) to first conductive leaf 105*a*.

Figure 5C:
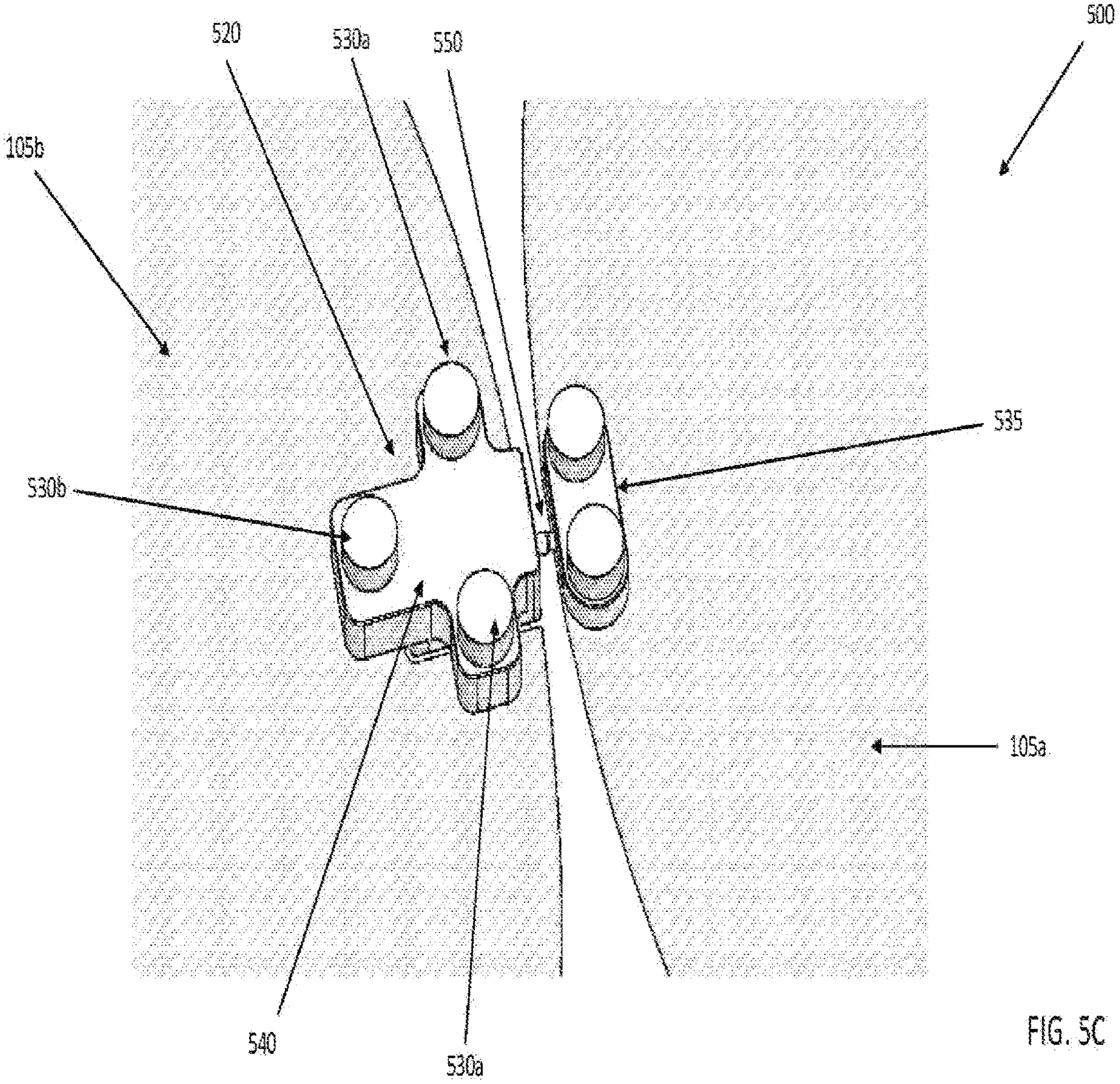
FIG. 5C is another view of the exemplary feed structure of FIG. 5A.

FIG. 5C is an alternate view of exemplary feed structure 520, showing feed inner conductor 550.

Figure 6A:
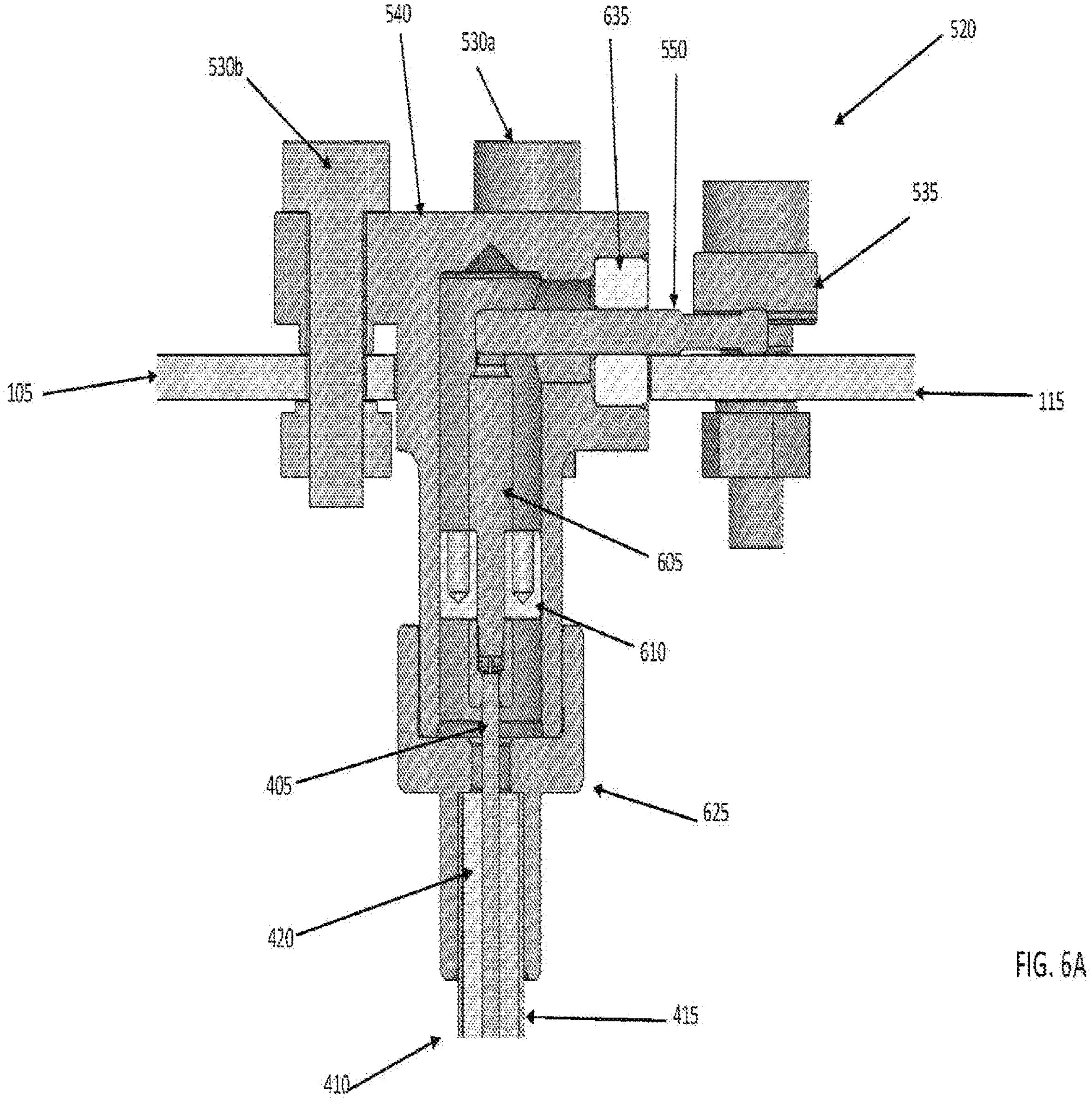
FIG. 6A is a cutaway view of the exemplary feed structure of FIG. 5A.

FIG. 6A is a cutaway view of exemplary feed structure 520. As illustrated, feed structure 520 is mounted to substrate 115 and has its feed structure body 540 mechanically coupled to substrate 115 by mechanical mount 530*a* (the opposite mechanical mount 530*a* is not shown in the cutaway) and third mechanical mount 530*b*. Feed structure body 540 is further electrically coupled to second conductive leaf 105*b* (as shown, around third mechanical mount 530*b*, but also in the vicinity of mechanical mounts 530*a*). Coupled to feed structure body 540 is connector body 625, which is coupled to RF cable 410. RF cable 410 has an outer conductor 415, which is electrically coupled to connector body 625; an insulator 420; and an inner conductor 405, which is electrically and mechanically coupled to port inner conductor 605 in a manner similar to that described in reference to FIG. 4. Port inner conductor 605 may be electrically isolated from feed structure body 540 by port insulator ring 610. Port inner conductor 605 may be mechanically and electrically coupled to inner feed conductor 550 in a manner similar to that described in reference to FIG. 4. Inner feed conductor 550 may be electrically isolated from feed structure body 540 by feed insulator ring 635, and mechanically and electrically coupled to first conductive leaf 105*a* by first mechanical mount 535.

Figure 6B:
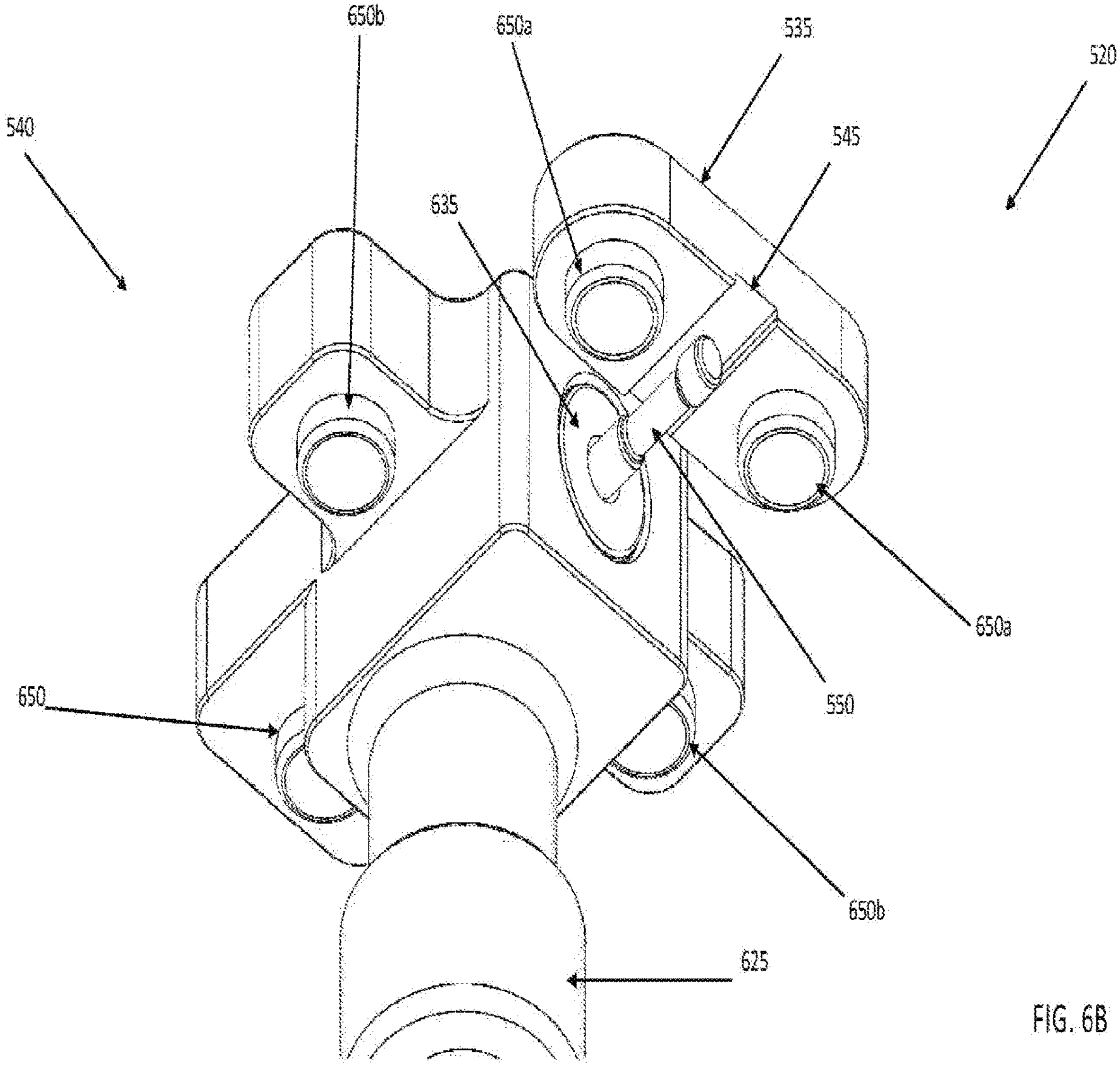
FIG. 6B is an alternate view of the exemplary feed structure of FIG. 5A.

FIG. 6B is an alternate view of feed structure 520 with substrate 115, backing film 110, first conductive leaf 105*a*, and second conductive leaf 105*b* removed. As illustrated, first mechanical mount 535 may be electrically coupled to first conductive leaf 105*a* by conductor pedestals 650*a*; and feed structure body 540 may be electrically coupled to second conductive leaf 105*b* by conductor pedestals 650*b*. The respective surface areas of conductor pedestals 650*a* and 650*b* may be configured to enable a high-pressure mechanical coupling to the surface of second conductive leaf 105*b*. First mechanical mount 535 provides high pressure contact onto first conductive leaf 105*a* and provides mechanical pressure contact on feed inner conductor 550 that translates the mechanical pressure through such that feed inner conductor 550 and first conductive leaf 105*a* are in high pressure mechanical contact. It's not practical to solder onto the thin film of conductive leaves, so mechanical pressure may be required. Further, high pressure (e.g., 10,000 psi or greater) is required to prevent Passive Intermodulation distortion (PIM). The high-pressure mechanical joining of electrically conductive surfaces is used to obtain good RF impedance connection while providing excellent PIM performance.

All of the exemplary antennas of the present disclosure have an upper frequency limit of approximately 7 GHz. The 7 GHz limit is due to the right angle connection of feed structure 220/520.

Figure 7:
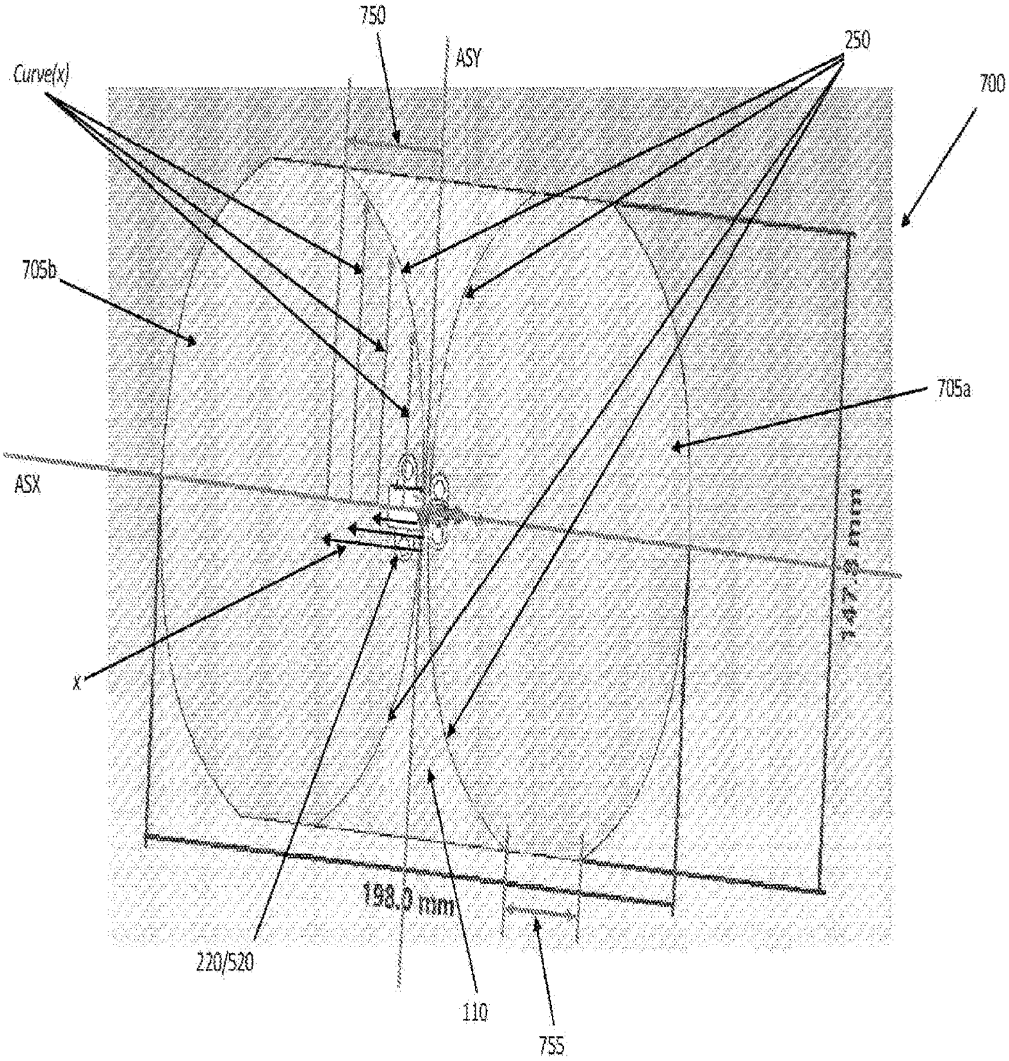
FIG. 7 illustrates an exemplary transparent antenna designed for operation from 617 MHz upwards.

FIG. 7 illustrates an exemplary transparent antenna 700 according to the disclosure. Antenna 700 is configured to operate in a frequency range from 617 MHz to approximately 7 GHz. Antenna 700 has first conductive leaf 705*a*; second conductive leaf 705*b*; and a feed structure that may be one of exemplary feed structure 220/520. The materials used for first conductive leaf 705*a* and second conductive leaf 705*b* may be the same for those used for first conductive leaf 105*a* and second conductive leaf 105*b*. Further, the substrate 115 and backing film 110 may also be the same.

Curvature 250 may be expressed according to the following relation:

$$\text{curve}(x)=\log \text{var}\cdot 1n[x]$$

Where the value curve(x) defines the point at the edge of the conductive leaf 105*a*/105*b*/705*a*/705*b* as a function of distance x from the edge of the conductive leaf where it intersects axis ASX. The range of values for x is from 1 mm to the throat length 750, which is the distance along axis ASX at which the curve(x) point reaches the outer edge of conductive leaf 105*a*/105*b*/705*a*/705*b*. In other words, the throat length 750 is the x value along axis ASX at which the value for curve(x) equals on half the width of antenna 700 along axis ASY. The parameter log var modifies the extent of the curvature for curve(x). For exemplary antenna 700, the outer curvatures mirror curvatures 250. Further illustrated in FIG. 7 is a value for leaf length 755, which is the distance along axis ASX between the ends of the curvatures 250 and the outer curvatures. Accordingly, the length of a given conductive leaf 705*a*/705*b* may be twice the throat length 750 plus the leaf length 755.

In the case of exemplary antenna 700, the parameter log var may be 20.62 (or −20.62); the throat length is 36 mm; the leaf length 755 is 28 mm; a leaf separation is 1 mm; the width of antenna 700 along axis ASY is 147.8 mm; and the length of antenna 700 along axis ASX is 198 mm.

Figure 8:
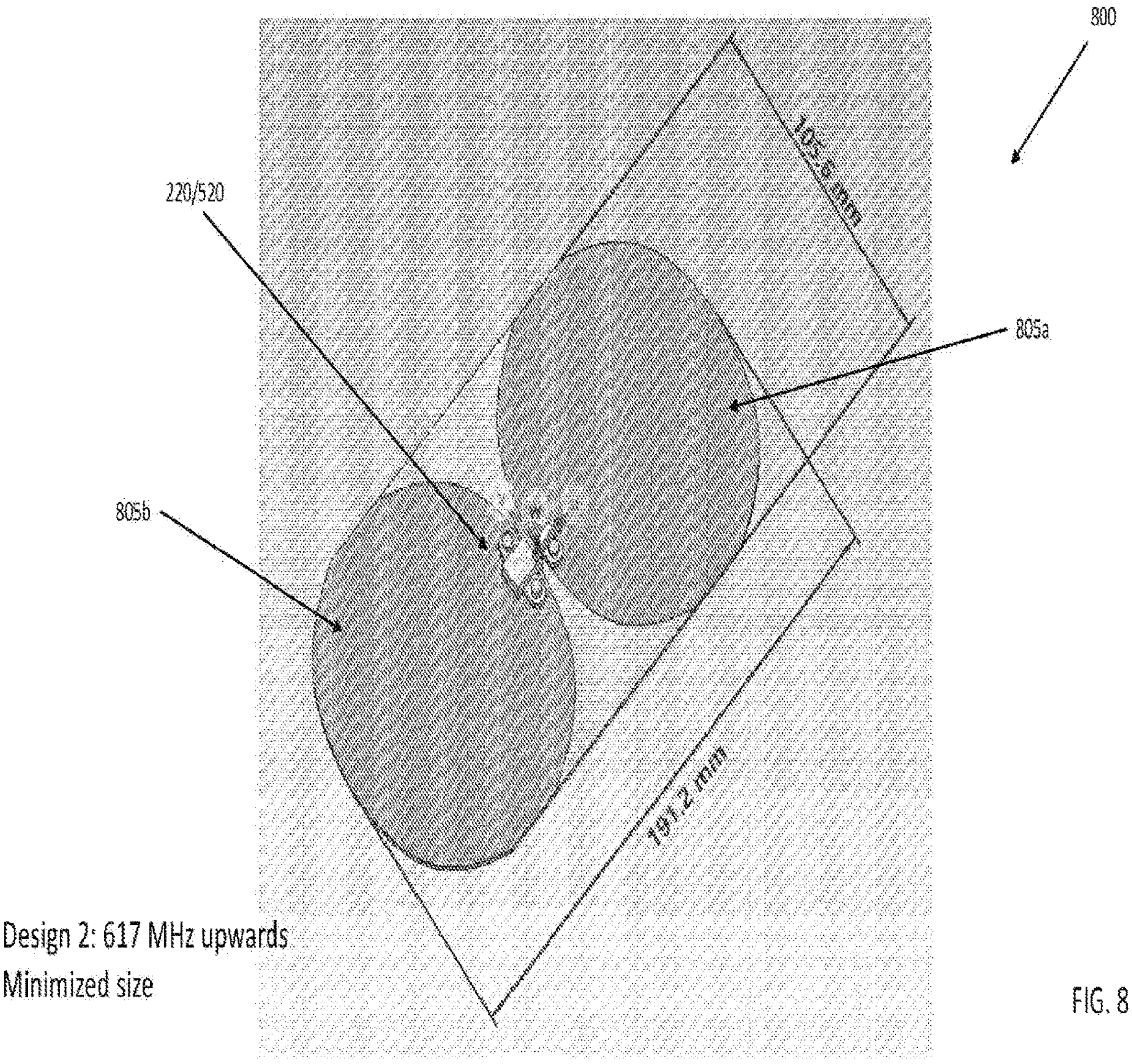
FIG. 8 illustrates an exemplary transparent antenna designed for operation from 617 MHz upwards and for minimized size.

FIG. 8 illustrates an exemplary transparent antenna 800 according to the disclosure. Antenna 800 is configured to operate in a frequency range from 617 MHz to approximately 7 GHz, similar to antenna 700. Antenna 800 has first conductive leaf 805*a*; second conductive leaf 805*b*; and a feed structure that may be one of exemplary feed structure 220/520. The materials used for first conductive leaf 805*a* and second conductive leaf 805*b* may be the same for those used for first conductive leaf 105*a* and second conductive leaf 105*b*. Further, the substrate 115 and backing film 110 may also be the same.

In the case of exemplary antenna 800, the parameter log var may be 14.7 (or −14.7); the throat length is 36. mm; the leaf length 755 is 24 mm; a leaf separation is 1 mm; the width of antenna 800 along axis ASY is 105.6 mm; and the length of antenna 800 along axis ASX is 191 mm.

One may note that antenna 800 is narrower than antenna 700 along the ASY axis (105.6 mm vs. 147.8 mm) but the throat length is substantially the same for both. This is because the log var parameters are different (14.7 vs. 20.62), which means that antenna 800 as a steeper curvature 250 than that of antenna 700. There is a design tradeoff here whereby narrower antenna 800 may be mounted in smaller spaces than wider antenna 700, but antenna 700 has a more consistent frequency performance than antenna 800. This is because an antenna with a shallower curvature 250 has a finer resolution in frequency response due to its more gradual curvature. This finer resolution results in a more consistent frequency response. In other words, the narrower antenna 800 with the steeper curvature 250 has a coarser resolution in frequency, which results in a more varied and less controlled antenna frequency response. However, antenna 800 is considerably smaller than antenna 700, and depending on the intended deployment, the advantages of the smaller size might outweigh the disadvantages of the coarser frequency response.

Figure 9:
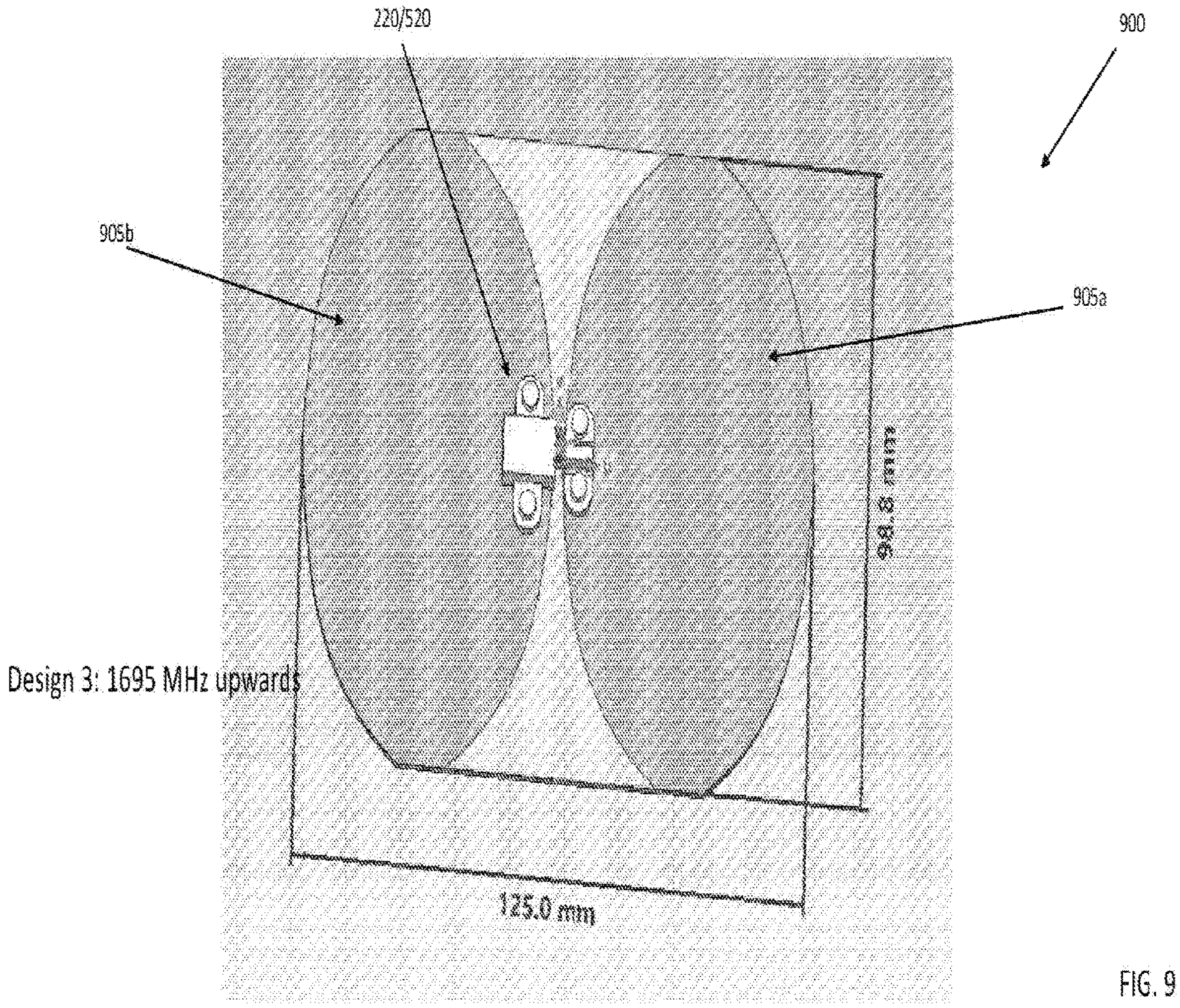
FIG. 9 illustrates an exemplary transparent antenna designed for operation from 1695 MHz upwards.

FIG. 9 illustrates an exemplary transparent antenna 900 according to the disclosure. Antenna 900 is configured to operate in a frequency range from 1695 MHz to approximately 7 GHz. Antenna 900 has first conductive leaf 905*a*; second conductive leaf 905*b*; and a feed structure that may be one of exemplary feed structure 220/520. The materials used for first conductive leaf 905*a* and second conductive leaf 905*b* may be the same for those used for first conductive leaf 105*a* and second conductive leaf 105*b*. Further, the substrate 115 and backing film 110 may also be the same.

In the case of exemplary antenna 900, the parameter log var may be 15.16 (or −15.16); the throat length is 26 mm; the leaf length 755 is 11.5 mm; a leaf separation is 1 mm; the width of antenna 900 along axis ASY is 98.8 mm; and the length of antenna 900 along axis ASX is 125 mm.

Figure 10:
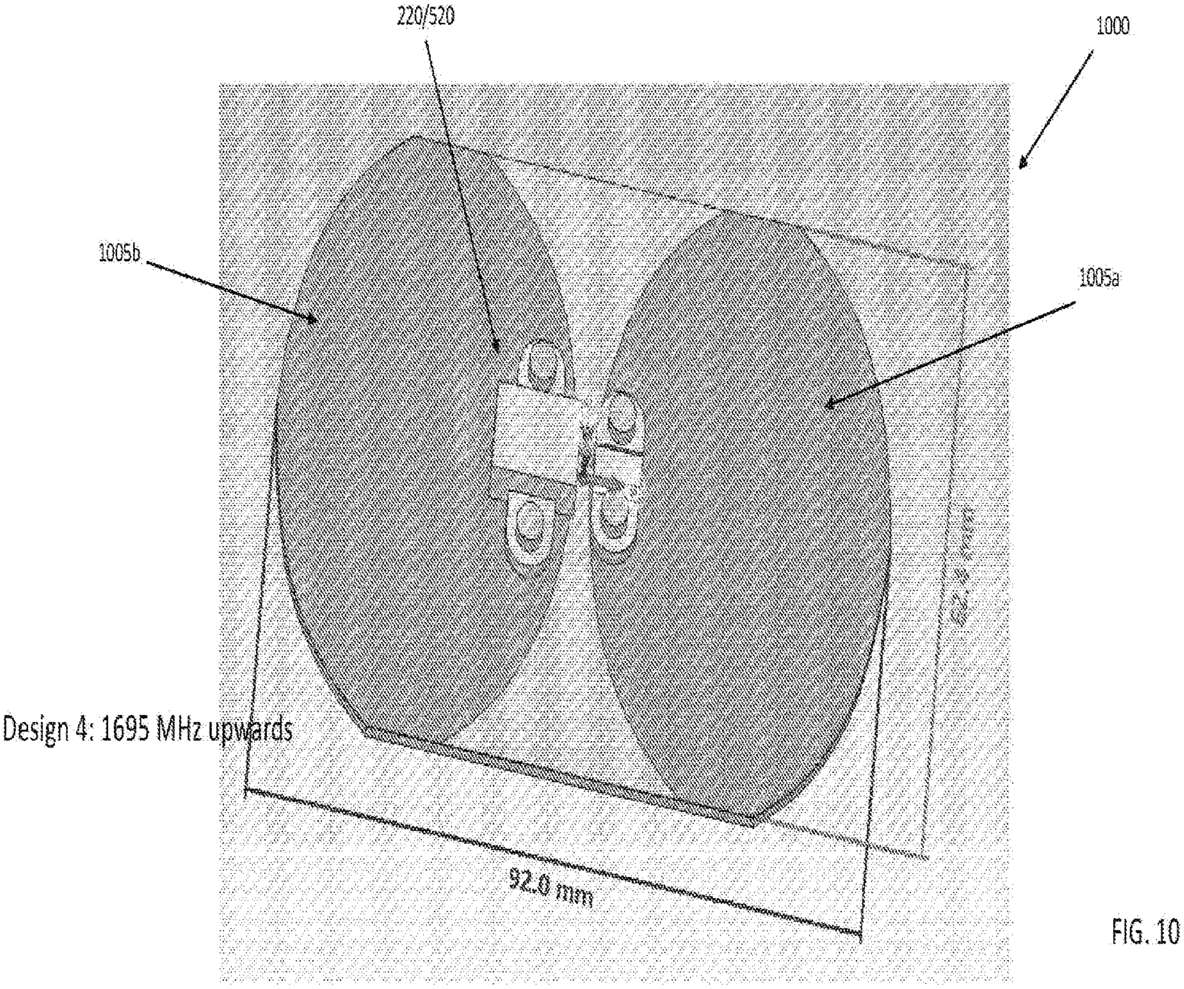
FIG. 10 illustrates an exemplary transparent antenna designed for operation from 1695 MHz and for minimum size.

FIG. 10 illustrates an exemplary transparent antenna 1000 according to the disclosure. Antenna 1000 is configured to operate in a frequency range from 1695 MHz to approximately 7 GHz. Antenna 1000 has first conductive leaf 1005*a*; second conductive leaf 1005*b*; and a feed structure that may be one of exemplary feed structure 220/520. The materials used for first conductive leaf 1005*a* and second conductive leaf 1005*b* may be the same for those used for first conductive leaf 105*a* and second conductive leaf 105*b*. Further, the substrate 115 and backing film 110 may also be the same.

In the case of exemplary antenna 1000, the parameter log var may be 10.8 (or −10.8); the throat length is 18 mm; the leaf length 755 is 11 mm; a leaf separation is 1 mm; the width of antenna 1000 along axis ASY is 62.4 mm; and the length of antenna 1000 along axis ASX is 92 mm.

The size vs. performance comparison between antennas 700 and 800 may also apply to antennas 900 and 1000.

Figure 11:
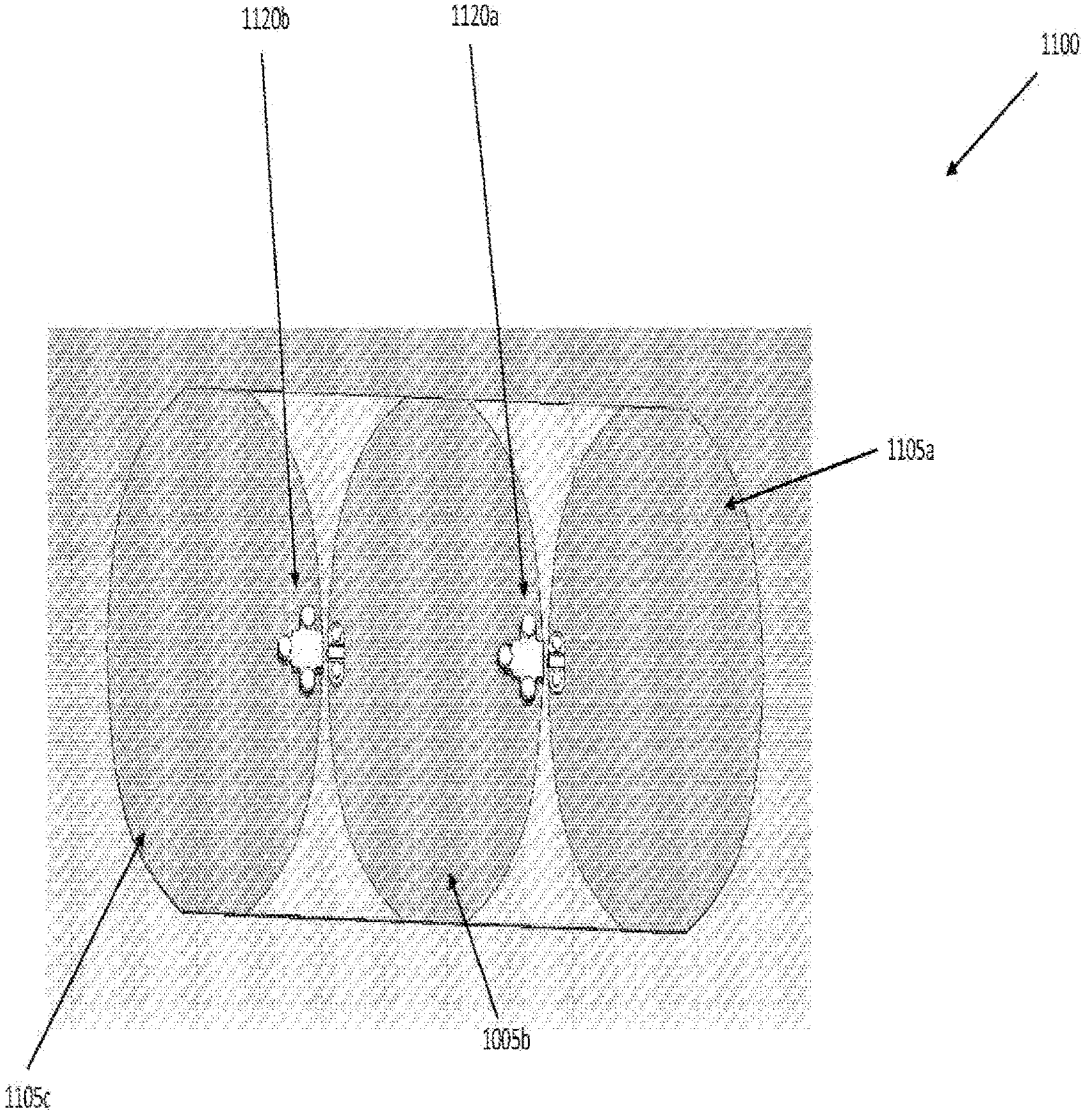
FIG. 11 illustrates a 2×2 MIMO (Multiple Input Multiple Output) configuration employing exemplary conductive leaf and RF feed components of the disclosure.

FIG. 11 illustrates an exemplary 2×2 MIMO (Multiple Input Multiple Output) configuration 1100, in which two RF feeds 1120*a*/*b* (each of which may be feed structures 220/520) are used to drive three conductive leaves 1105*a*, 1105*b*, and 1105*c*. Each of the three conductive leaves 1105*a*/*b*/*c* may be identical to exemplary conductive leaves 105*a*/*b*, 705*a*/*b*, 805*a*/*b*, 905*a*/*b*, and 1005*a*/*b*. In this configuration, conductive leaf 1105*b* is shared between two RF feeds 1120*a*/*b*. For example, the inner conductor (now shown) of RF feed 1105*a* is electrically coupled to conductive leaf 1105*a*, and the outer conductor (not shown) of RF feed

1120*a* is electrically coupled to conductive leaf 1105*b*; whereas the inner conductor (not shown) of RF feed 1120*b* is electrically coupled to conductive leaf 1105*b*, and the outer conductor (not shown) of RF feed 1120*b* is electrically coupled to conductive leaf 1105*c*.

Figure 12:
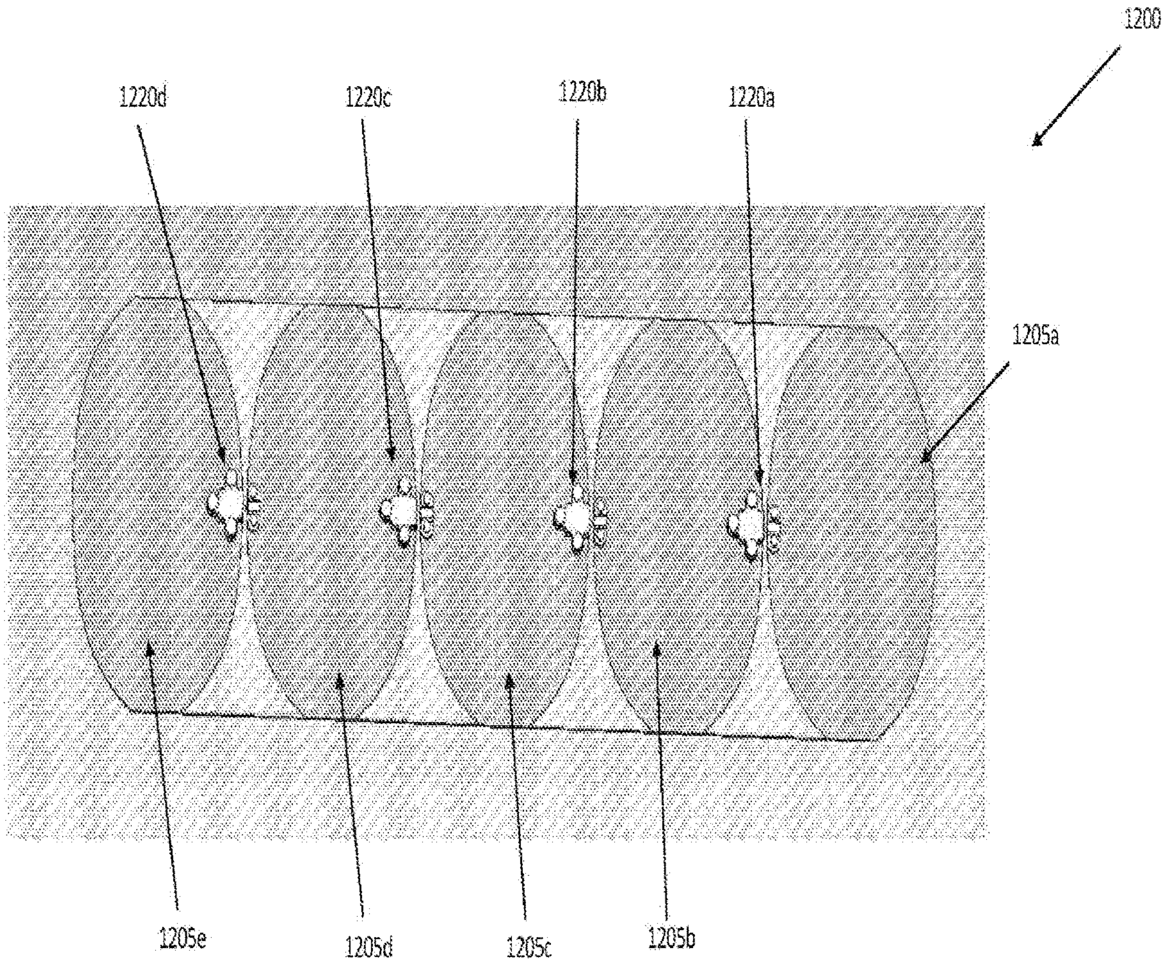
FIG. 12 illustrates a 4×4 MIMO configuration employing exemplary conductive leaf and RF feed components of the disclosure.

FIG. 12 illustrates an exemplary 4×4 MIMO configuration 1200, in which four RF feeds 1220*a/b/c/d* (each of which may be feed structures 220/520) are used to drive three conductive leaves 1205*a*, 1205*b*, 1205*c*, and 1205*d*. Each of the five conductive leaves 1205*a/b/c/d/e* may be identical to exemplary conductive leaves 105*a/b*, 705*a/b*, 805*a/b*, 905*a/b*, and 1005*a/b*. In this configuration, conductive leaf 1205*b* is shared between two RF feeds 1220*a/b*; conductive leaf 1205*c* is shared between RF feeds 1220*b* and 1220*c*; and conductive leaf 1205*d* is shared between RF feeds 1220*c* and 1220*d*. The sharing of a conductive leaf as illustrated for configuration 1200 may be done the same way as for configuration 1100, but expanded.

Accordingly, other MIMO configurations (e.g., 8×8, 16×16, etc.) are possible, whereby an N×N MIMO deployment only requires N+1 conductive leaves.

An advantage of the feed structure 220/520 is that it enables direct coupling from an RF cable to the two conductive leads, obviating the need for a matching circuit and subsequent bandwidth limitations.

FIG. 13 is a table of exemplary copper mesh parameters, including copper thickness, line width, and line pitch. As used herein, line width is the width of the copper strands forming the mesh, and line pitch is the distance between copper strands.

In addition to copper mesh for the conductive leaves disclosed above, it is also possible to use a thin copper film. In this variation, the copper thin film may be etched directly on the substrate without the need of a backing film. This variation may be used in applications where transparency is not required and the antenna may be painted to blend into its environment. It will be understood that such variations are possible and within the scope of the disclosure. While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. An antenna, comprising:
- a first conductive leaf;
- a second conductive leaf; and
- a feed structure comprising a body, an inner feed conductor, an inner port conductor, and an outer port conductor, wherein the feed structure is configured to couple the inner feed conductor to an inner conductor of an RF cable and couple the outer port conductor to an outer conductor of the RF cable,
- wherein the inner port conductor is electrically coupled to the inner feed conductor, and the inner feed conductor is electrically coupled and mechanically affixed to the first conductive leaf by a first mechanical mount,
- wherein the body is mechanically and electrically coupled to the outer port conductor, and the body is electrically coupled and mechanically affixed to the second conductive leaf via a second mechanical mount,
- wherein the first conductive leaf and the second conductive leaf are disposed on a substrate, and wherein the first conductive leaf and the second conductive leaf are axially symmetric about a first axis and a second axis, the second axis being orthogonal to the first axis, and wherein the first axis bisects both the first conductive leaf and the second conductive leaf and the second axis separates the first conductive leaf and the second conductive leaf.

2. The antenna of claim 1, wherein the first conductive leaf and the second conductive leaf have first curvature whereby a separation between the first conductive leaf and the second conductive leaf increases with distance along the second axis to form two back-to-back Vivaldi radiators.

3. The antenna of claim 2, wherein the separation between the first conductive leaf and the second conductive leaf increases exponentially with distance from the first axis along the second axis.

4. The antenna of claim 1, wherein the first conductive leaf and the second conductive leaf each have two curved outer corners.

5. The antenna of claim 1, wherein the first conductive leaf, the second conductive leaf, and the substrate are transparent.

6. The antenna of claim 1, wherein the feed structure is disposed at an intersection of the first axis and the second axis.

7. The antenna of claim 1, wherein the inner feed conductor is mechanically coupled to the inner port conductor at a 90 degree angle.

8. The antenna of claim 1, further comprising a backing film disposed between the first conductive leaf and the substrate, and between the second conductive leaf and the substrate.

9. The antenna of claim 8, wherein the backing film comprises polyethylene terephthalate (PET).

10. The antenna of claim 1, wherein the first conductive leaf and the second conductive leaf comprise a transparent copper mesh.

11. An antenna having a central x axis and a central y axis, comprising:
- a substrate;
- a first conductive leaf disposed on the substrate;
- a second conductive leaf disposed on the substrate; and
- an RF (Radio Frequency) feed structure that electrically couples a first RF conductor to the first conductive leaf and a second RF conductor to the second conductive leaf,
- wherein both the first conductive leaf and the second conductive leaf are symmetric about the central x axis, and the first conductive leaf and the second conductive leaf each mirror each other about the central y axis, wherein the first conductive leaf and the second conductive leaf together form two Vivialdi radiators disposed on opposite sides of the central x axis,
- wherein the first conductive leaf and the second conductive leaf each have a curvature defined by a relation $$\text{curve}(x)=\log\text{var}\cdot 1n[x],\ \text{and}$$

wherein logvar comprises a parameter, and x comprises a distance along the central x axis.

12. The antenna of claim 11, wherein the first conductive leaf and the second conductive leaf each have an exponential curvature that increases as a function of distance from the central x axis.

13. An N×N MIMO (Multiple Input Multiple Output) antenna having a longitudinal axis, comprising:

a plurality of conductive leaves arranged in a sequence along the longitudinal axis, wherein the plurality of conductive leaves are symmetric about the longitudinal axis, wherein each adjacent pair of conductive leaves form two Vivaldi radiators disposed on opposite sides of the longitudinal axis; and a plurality of RF feed structures disposed along the longitudinal axis, wherein each of the plurality of RF feed structures is disposed at a convergence point between two adjacent conductive leaves, wherein a number of conductive leaves is equal to N+1, wherein each conductive leaf of each adjacent pair of conductive leaves forming two Vivaldi radiators has a curvature defined by a relation $$\text{curve}(x)=\log\text{var}\cdot 1n[x], \text{ and}$$

wherein logvar comprises a parameter, and x comprises a distance along the longitudinal axis.

* * * * *